E. STAHLBRODT.
Lathe Rest.
No. 77,672.
Patented May 5, 1868.
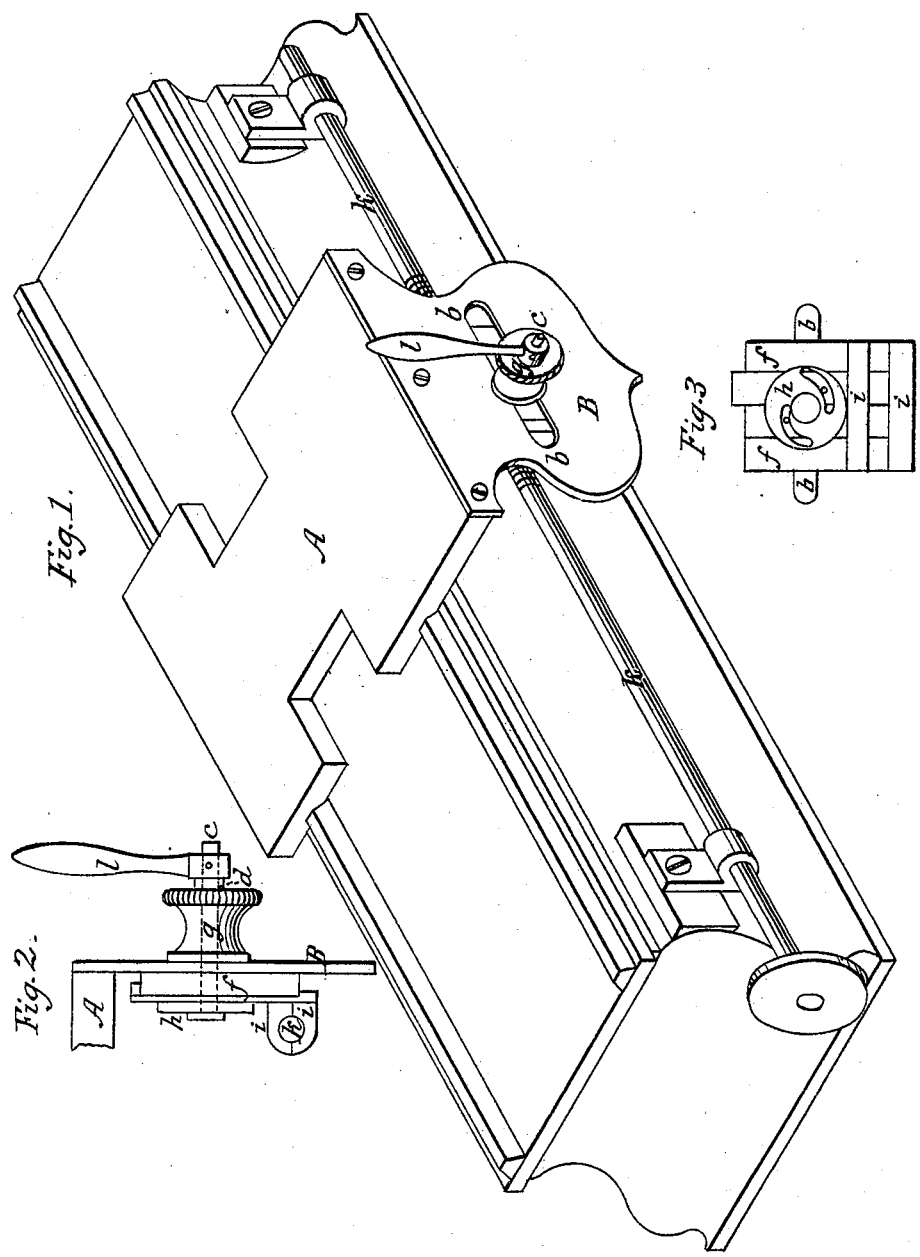
Witnesses
Geo. Frauenberger
Geo. Eichorn
Inventor
Edward Stahlbrodt

United States Patent Office.

EDWARD STAHLBRODT, OF ROCHESTER, NEW YORK.

*Letters Patent No. 77,672, dated May 5, 1868.*

IMPROVEMENT IN LATHE-RESTS.

*The Schedule referred to in these Letters Patent and making part of the same.*

TO ALL WHOM IT MAY CONCERN:

Be it known that I, EDWARD STAHLBRODT, of Rochester, county of Monroe, and State of New York, have invented a new and useful Improvement on Lathes; and I do hereby declare that the following is a full and exact description thereof, reference being had to the accompanying drawings, and to the letters of reference marked thereon.

Figure 1 represents a perspective view of a lathe with my improvement thereon.

Figure 2 represents a side view of my improvement, showing the shear-knot $i\ i$ closed.

Figure 3 represents a transverse section of shear-knot $i\ i$ drawn open, also the swivel $h$.

The nature of my invention consists in providing the apron or aprons of any lathe with a slot for the purpose of moving the carriage of any lathe either way, as may be required, the length of the slot, without opening the shear-knot.

Great difficulty has been experienced in replacing a chisel on the lathe when cutting screws, if from course of accident or necessity the chisel has to be taken out before the whole length of the screw is cut. It is almost impossible to bring the point of the newly inserted chisel in the same place where the chisel taken out had left off. In all lathes now in use, the shear-knot has to be opened in order to move the carriage to the desired point, but when the proper place is found, the shear-knot may not exactly fit in the grooves of the screw which moves the carriage.

To enable others skilled in the art to make or use my invention, I will proceed to describe the construction and operation of the same.

I cut a slot (marked $b\ b$ in drawing) in the apron or aprons B of any lathe. Through this slot $b\ b$ passes a hollow screw, $d$, and inside of the hollow screw $d$ is a rod, $c$, extending beyond either end of screw $d$, both working independent of each other. The hollow screw $d$ is made solid to the frame or slide $ff$ of the shear-knot $i\ i$ on the inside of apron B, and is provided with a knot, $g$, on the outside of apron B. The rod $c$ projects beyond the hollow screw $d$. One end of the rod $c$ is made solid to the swivel $h$ on the inside of apron B, and the opposite end of rod $c$, on the outside of apron B, is provided with a lever at handle $e$.

The rod $c$ attached to swivel $h$, with lever $l$ on the extreme end, is for the purpose of opening or closing the shear-knot $i\ i$. By loosening the knot $g$ the carriage A can be moved either way the length of the slot $b\ b$, and the point of chisel can easily be brought to the proper place, and without disturbing the shear-knot $i\ i$, and as soon as the chisel is brought in its proper position the knot $g$ is to be tightened, and the lathe may be set to work.

What I claim as my invention, and desire to secure by Letters Patent, is—

The combination of slotted apron B, knot $g$, screw $d$, plate $f$, and tool-carriage A, when constructed and arranged substantially as described.

EDWARD STAHLBRODT.

Witnesses:
GEORGE FRAUENBERGER,
GEO. EICHORN.